United States Patent
Knight et al.

(10) Patent No.: US 6,845,813 B1
(45) Date of Patent: Jan. 25, 2005

(54) INTRA-BODY FLOW DISTRIBUTOR FOR HEAT EXCHANGER

(75) Inventors: Clifton Troy Knight, Houston, TX (US); David Raymond Lowry, Houston, TX (US); Judeth Brannon Corry, Manvel, TX (US); Kenneth Roy Williams, Jr., LaMarque, TX (US)

(73) Assignee: Knighthawk Engineering, Houston, TX (US)

( * ) Notice: Subject to any disclaimer, the term of this patent is extended or adjusted under 35 U.S.C. 154(b) by 0 days.

(21) Appl. No.: 10/684,038

(22) Filed: Oct. 13, 2003

(51) Int. Cl.$^7$ .............................. F28F 9/22; F28F 13/06
(52) U.S. Cl. .................... 165/174; 165/119; 165/134.1; 165/158
(58) Field of Search ........................... 165/119, 134.1, 165/158, 174

(56) References Cited

U.S. PATENT DOCUMENTS

| | | | | |
|---|---|---|---|---|
| 2,602,647 A | * | 7/1952 | Miller | 165/134.1 |
| 2,768,814 A | * | 10/1956 | Frey et al. | 165/174 |
| 2,772,076 A | * | 11/1956 | Matthews | 165/174 |
| 2,813,708 A | * | 11/1957 | Frey et al. | 165/174 |
| 3,357,485 A | * | 12/1967 | O'Sullivan et al. | 165/174 |
| 3,552,487 A | | 1/1971 | Tokumitsu et al. | 165/174 |
| 3,771,638 A | * | 11/1973 | Schneider et al. | 165/174 |
| 3,802,497 A | * | 4/1974 | Kummel et al. | 165/158 |
| 4,764,254 A | | 8/1988 | Rosenblad | 162/249 |
| 5,029,637 A | | 7/1991 | Brucher et al. | 165/119 |
| 5,531,266 A | * | 7/1996 | Ragi et al. | 165/174 |
| 6,684,938 B2 | * | 2/2004 | Tsujita et al. | 165/174 |

FOREIGN PATENT DOCUMENTS

| | | | |
|---|---|---|---|
| DE | 1000194 | 1/1957 | F24F/13/08 |
| SU | 1080002 | 3/1984 | F28F/21/02 |
| SU | 1146535 | 3/1985 | F28F/9/02 |

OTHER PUBLICATIONS

Picture of"Erosion Protection Shield" by Borsig Technologies, Inc., available about 1991, 1–page.

* cited by examiner

*Primary Examiner*—Leonard R. Leo
(74) *Attorney, Agent, or Firm*—Locke Liddell & Sapp LLP (57) ABSTRACT

A flow distributor for mounting in an inlet of a heat exchanger includes a nose cone and one or more diverting rings. The nose cone is aerodynamically shaped to divert impingent gas flow around the nose cone. A first diverting ring is spaced outwardly from the nose cone and can be oriented such that at least a portion of the gas flow diverted by the nose cone is redirected into the wake of the nose cone. A second diverting ring can be spaced outwardly from the first diverting ring and can be oriented to divert gas flow impingent thereon. Struts connect the nose cone and one or more rings. Refractory on the wall of the inlet is shaped to reduce the recirculation at the outer perimeter thereof. The flow distributor is installed in the inlet with refractory to achieve substantially equal flow across the tube sheet of the heat exchanger.

31 Claims, 5 Drawing Sheets

INTRA-BODY FLOW DISTRIBUTOR FOR HEAT EXCHANGER

FIELD OF THE INVENTION

The subject matter of the present disclosure relates generally to a device for distributing gas flow in a pipe that feeds the gas into a heat exchanger. More particularly, the subject matter of the present disclosure relates to a flow distributor mounted in an inlet section of a transfer line heat exchanger for evenly distributing gas flow to a tube sheet of the heat exchanger.

BACKGROUND OF THE INVENTION

Figure 1:
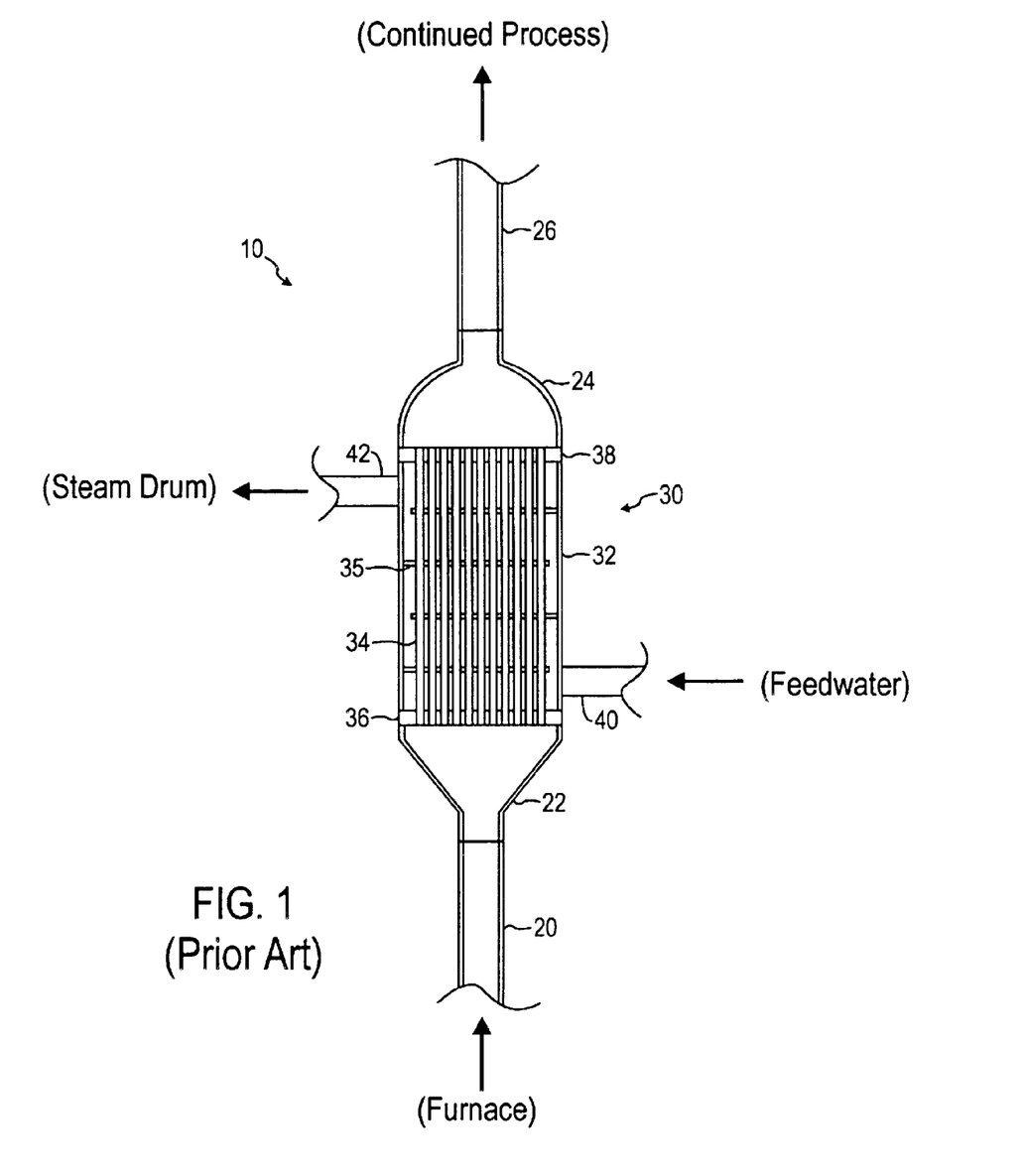
FIG. 1 illustrates a portion of a process system having a transfer line heat exchanger known in the art is schematically illustrated.

Thermal cracking of hydrocarbons is a large-scale process for the production of light olefins, such as ethylene and propylene, which are major building blocks of the petrochemical industry. Referring to FIG. 1, a portion of a thermal cracking process is schematically illustrated. Feedstock, such as naphtha, methane, ethane, propane, or butane, is cracked in a pyrolysis or cracking furnace (not shown) to generate light hydrocarbons. The process gas leaves the furnace at temperatures ranging from 750 to 900° C. (1400 to 1650° F.) and at pressures between 0.5 to 1.0 bar (7 to 15 psig). The products in the process gas leaving the furnace are not stable at the high temperature at the outlet of the furnace. To avoid overreactions and loss of light olefins, the process gas is rapidly cooled after leaving the furnace in a number of quenching stages, which quickly stop the chemical reactions of the process gas.

An initial quenching stage uses a transfer line heat exchanger 30 known in the art. The transfer line heat exchanger 30 is a tube and shell type heat exchanger that is cooled by feed water steam as an intermediate heat carrier. Piping 20 connects the source of the process gas (e.g., the furnace) to the transfer line heat exchanger 30. Typically, the transfer line heat exchanger 30 is much larger in diameter than the piping 20 used to convey the process gas so that an inlet section 22 is typically used to expand the piping 20 to fit the larger diameter of the transfer line heat exchanger 30.

The transfer line heat exchanger 30 includes a shell 32, a plurality of heat transfer tubes 34, an inlet tube sheet 36, and an outlet tube sheet 38. An inlet 40 and an outlet 42 for feed water connect to the shell 32. The heat exchanger 30 may contain as many as 1500 to 2000 transfer tubes 34 through which the process gas flows from an inlet section 22 to an outlet section 24. The transfer tubes 34 are connected to holes in the tube sheets 36 and 38. Tie rods and baffle plates within the shell 32 are used with the bundle of tubes 34. As the tubes 34 carry the gas through the shell 32 of the heat exchanger 30, the tubes 34 are surrounded by feed water steam that flows through the shell 32 of the heat exchanger 30 for cooling the process gas. The discharge section 24 connects to additional piping 26 of the process system, where the process gas is taken to for continued processing, such as further quench stages to cool the gas. When quenching the process gas during use, the stream of process gas after leaving the furnace of the industrial cracker may be cooled within the heat exchanger 30 from 850° C. or more, down to 400° C. or less.

Figures 2, 3:
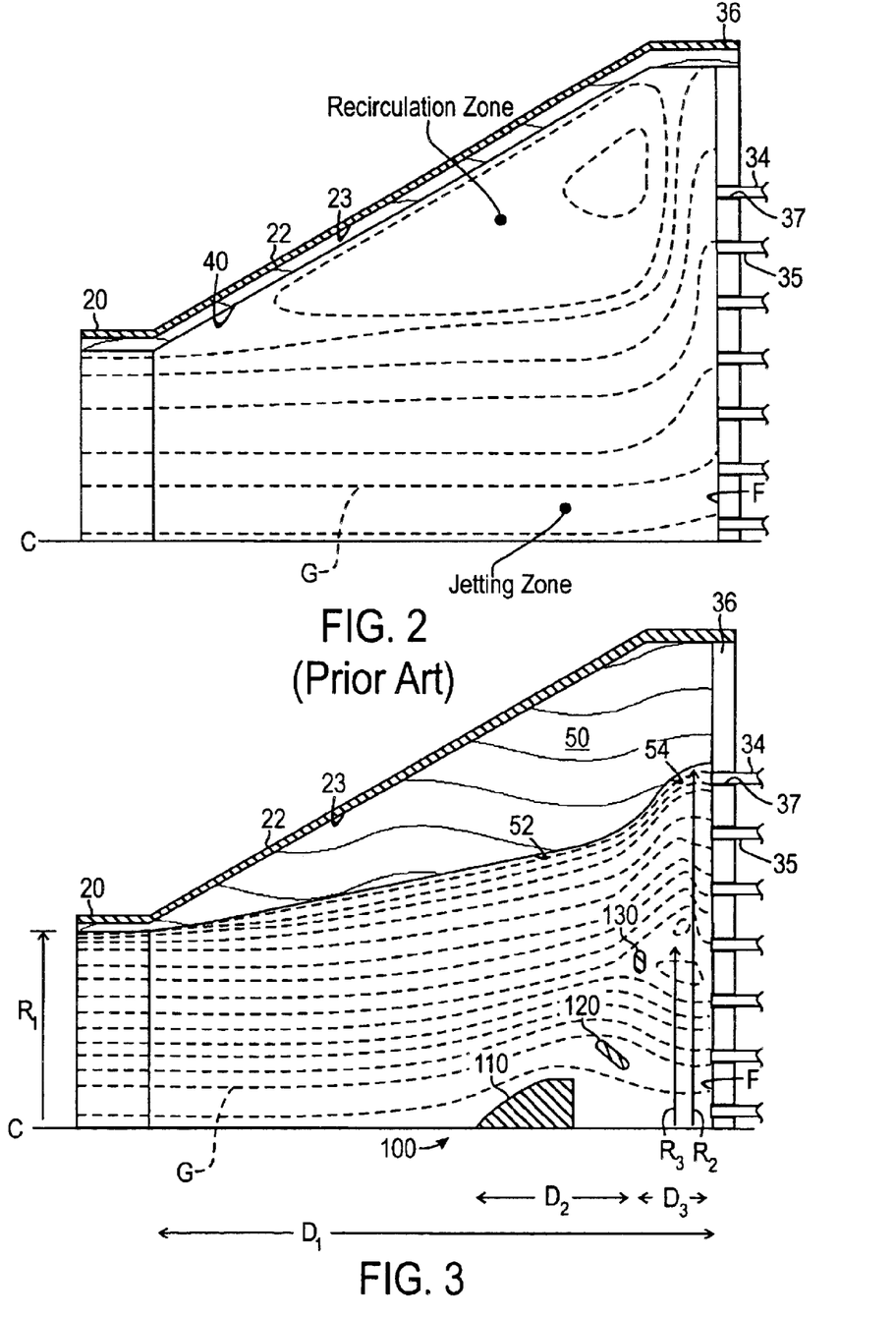
FIG. 2 schematically illustrates an inlet section and tube sheet of the process system of FIG. 1.
FIG. 3 schematically illustrates an inlet section and tube sheet of a process system having refractory and a flow distributor according to certain teachings of the present disclosure.

Referring to FIG. 2, the inlet section 22 and the inlet tube sheet 36 of the transfer line heat exchanger are schematically shown. The inlet section 22 and tube sheet 36 are symmetric about a central axis C so that only a portion of the inlet section 22 and tube sheet 36 is shown for convenience. The inlet section 22 is typically lined with refractory 40 for thermally insulating the inlet section 22. Streamlines G schematically show the laminar flow of the process gas as it travels from the furnace piping 20, to the inlet section 22, through the holes in the tube sheet 36, and into the transfer tubes 34. As noted above, the tube sheet 36 typically has a number of transfer tubes connected to holes 37 in the tube sheet 36. Only a few tubes 34 are illustrated for convenience.

As is known in the art of chemical processing, the transfer line heat exchanger 30 such as described herein can suffer from a number of problems. For example, problems can occur at the inlet tube sheet 36 of the exchanger 30. In many applications, for example, a recirculation zone can occur in the inlet section 22 near the face F of the inlet tube sheet 36. The recirculation zone is schematically shown in FIG. 2 near the periphery of the inlet tube sheet 36. The geometry of the inlet section 22 along with the flow rate of the process gas creates the recirculation zone in the inlet section 22. The formation of the recirculation zone thereby increases the peak velocity at the tube sheet 38, which can be as great as 1880 in/sec, for example. Ideally, if the formation of the recirculation zone did not occur, the process gas would be more uniformly distributed at the face of the tube sheet 36, and the average velocity would be approximately 566 in/sec, for example.

Due to the recirculation, the process gas may be poorly distributed at the face of the tube sheet, and the velocity of the process gas is greater than ideally desired. Under these conditions, the heat transfer film coefficients on the face F (i.e., the process gas side) of the tube sheet 36 will be higher than ideal, and the associated temperatures will be higher than if the flow of the process gas were more evenly distributed. In addition, recirculation can cause fouling on certain portions of the tube sheet 38, for example the outer edge, so that the chances of plugging of certain tubes 34 are increased. For example, the formation of carbonaceous deposits can accumulate near the periphery of the tube sheet 36, diminishing the ability of the process gas to pass through the outer tubes 34. Such fouling conditions decrease the efficiency of the system.

If a group of tubes 34 becomes plugged from the recirculating gas, then the peak velocity near the open portion of the tube sheet 36 will further increase, creating jetting conditions or a jetting zone in the piping 20 and inlet section 22. The high velocity gas streams in the jetting zone can produce film boiling on the tube sheet 36. As is known in the art, film boiling can cause the welded joint of the tubes 34 to the sheet to fail and can exacerbate corrosion at the welded joint. In addition, erosion of the tube sheet 36 can occur if there are particles in the process gas, and such erosion can be further compounded if jetting conditions are produced.

To reduce the problem of fouling, periodic removal of the fouling deposits may be necessary. Typically, the transfer line heat exchanger 30 must be put out of service to remove the fouling. In the art, coatings may also be used to reduce the potential for fouling. Unfortunately, the intense heat of the process gas in the inlet section 22 can quickly destroy any such coatings. To solve problems related to recirculation and jetting conditions, it is known in the art to form the refractory 40 in the inlet section 22 in a shape that can reduce the recirculation of the process gas near the edge of the tube sheet 36. For example, the refractory 40 may be given a "bell" or "trumpet" shape from the piping 20 to the face F of the tube sheet 36. Other solutions in the prior art include inserting a piece of equipment to breakup the gas flow in the inlet section 22. Because the heat of the process gas is so intense, the equipment used to break up the flow can be quickly destroyed, which can lead to additional problems. To prevent erosion, another device known in the art, called an "Erosion Protection Shield" manufactured by Borsig Gmbh, is placed in the inlet section.

The subject matter of the present disclosure is directed to overcoming, or at least reducing the effects of, one or more of the problems set forth above.

SUMMARY OF THE DISCLOSURE

An intra-body flow distributor for distributing gas flow in an inlet into a heat exchanger is disclosed. The distributor includes a nose cone and one or more diverting rings. The nose cone has a leading portion and a trailing portion and is aerodynamically shaped to divert impingent gas flow around the nose cone. A first diverting ring is spaced outwardly from the nose cone. The first diverter ring can be oriented such that gas flow diverted by the nose cone is redirected into the shadow of the trailing portion of the nose cone. A second diverting ring can be spaced outwardly from the first diverting ring and can be oriented to redirect gas flow both inwardly and outwardly of the second ring. If necessary, additional rings can then be spaced outwardly from the second diverting ring and can be oriented to redirect gas flow both inwardly and outwardly of the additional ring. A plurality of first struts connects the first diverting ring to the nose cone, and a plurality of second struts connects the second diverting ring to the first diverting ring. The distributor preferably mounts in the inlet section of the transfer line hear exchanger using a plurality of rods and anchors. Smooth ends of the rods preferably fit loosely into holes in the nose cone. The anchors are preferably cast in refractory of the inlet section. Threaded ends of the rods then preferably thread into the threaded openings in the anchors to mount the distributor in the inlet section.

A method for improving the distribution of gas flow in an existing process heat exchanger system is disclosed. The existing process heat exchanger system includes gas flow piping and a heat exchanger input section. The method includes modeling the gas flow characteristics of the existing process heat exchanger system and thereby optimizing the shape of the refractory in the heat exchanger input section based on the gas flow characteristics. Next, the size and orientation of a flow distributor having a nose cone and one or more diverting rings is optimized to substantially evenly distribute the process gas at the tube sheet of the existing process heat exchanger system. The size and orientation of the nose cone is optimized to distribute any centrally located jet of gas. To optimize the nose cone, a position along a central axis of the input section, a diameter, an axial expanse, or a surface curvature of the nose cone can be iteratively determined. The size and orientation within the input section of a first diverter ring can be optimized to divert at least a portion of the gas flow distributed by the nose cone into the shadow of the nose cone. To optimize the first diverter ring, a radius, a width, a relative separation from the nose cone, or an angular orientation of the first diverter ring can be iteratively determined. The size and orientation within the input section of a second diverter ring can be optimized to redirect gas flow toward and away from the second diverter ring. Using more than one diverter ring within the input section can be based on the size of the input section or the characteristics of the gas flow. An assembly is then fabricated that includes the nose cone and diverter ring(s). The assembly is installed in the input section of the existing process heat exchanger system for substantially evenly distributing the process gas.

The foregoing summary is not intended to summarize each potential embodiment or every aspect of the subject matter of the present disclosure.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which.

While the disclosed flow distributor is susceptible to various modifications and alternative forms, specific embodiments thereof have been shown by way of example in the drawings and are herein described in detail. The figures and written description are not intended to limit the scope of the inventive concepts in any manner. Rather, the figures and written description are provided to illustrate the inventive concepts to a person skilled in the art by reference to particular embodiments, as required by 35 U.S.C. § 112.

DETAILED DESCRIPTION

Referring to FIG. 3, a flow distributor 100 according to certain teachings of the present disclosure is schematically illustrated. The flow distributor 100 is installed in an inlet section 22 connected to a transfer line heat exchanger similar to that described previously for use in quenching stages of a thermal cracking process. Although the present embodiment of the flow distributor 100 is discussed for use in such a thermal cracking process in the present disclosure, one of ordinary skill in the art will appreciate that teachings of the present disclosure can be used for a number of applications having flow of a fluid.

The flow distributor 100 distributes the process gas from the furnace piping 20 and inlet section 22 into the transfer line heat exchanger of a process system. As noted above, the transfer line heat exchanger (not shown) includes a tube sheet 36 having a plurality of holes 37 for passage of the process gas into transfer tubes 34 of the heat exchanger. Because the inlet section 22 and tube sheet 36 are symmetric about a central axis C, only a portion of the inlet section 22 and tube sheet 36 is shown in FIG. 3 for convenience. Streamlines G schematically show laminar flow of the process gas as it travels from the furnace piping 20, to the inlet section 22, and to the tube sheet 36 having the transfer tubes 34. As noted above, the tube sheet 36 may have a large number of tubes 34 attached to the holes in the tube sheet 36, and only a few are schematically shown for simplicity.

The inside wall 23 of the inlet section 22 preferably has refractory 50 formed thereon. The refractory 50 is typically composed of a high temperature insulating and castable material that is cast onto the inside wall 23 of the inlet section 22 using techniques known in the art. Preferably, the refractory 50 on the wall 23 is shaped to reduce the recirculation at the outer perimeters of the inlet section 22 and tube sheet 36 as much as possible. Suitable teachings for optimizing the shape of the refractory 50 are provided below.

The flow distributor 100 mounts in the inlet section 22 of the gas flow piping to the heat exchanger 30. Details of a preferred technique for mounting the flow distributor 100 in the refractory 50 formed in the inlet section 22 are provided below with reference to FIGS. 5–8. To survive the hot gas and flow conditions present in the inlet section 22, the flow distributor 100 is preferably sand cast from a high temperature alloy, such as 800-HT. Furthermore, the surfaces of the flow distributor 100 are preferably smooth to a finish within ASTM A802 Grade A2 (no bake) tolerances.

The flow distributor 100 has optimized or iteratively determined geometries so that it will achieve substantially equal distribution of process gas across the face F of the tube sheet 36 when installed within the inlet section 22. In other words, the flow distributor 100 preferably orients the gas so that the gas impacts the tube sheet 36 with a substantially even distribution. In addition, the flow distributor 100 preferably orients the gas to achieve a substantially even temperature gradient across the face F of the tube sheet 36.

In general, the inlet section 22 to the transfer line heat exchanger for a particular implementation may have an axial expanse $D_1$ of about 5 to 500-inches from the furnace piping 20 to the inlet tube sheet 36. The refractory 50 may have a radial dimension $R_2$ of about 5 to 500-inches adjacent the tube sheet 36. The flow distributor 100 may have an axial expanse $D_2$ of about 2 to 200-inches and may be distanced an axial expanse $D_3$ from the tube sheet 36 by about 1 to 20-inches. In addition, the flow distributor 100 may have a radial dimension $R_3$ of about 5 to 500-inches. As best described below, the various dimensions and ranges set forth above depend on a number of factors.

As only schematically shown in FIG. 3, the flow distributor 100 includes a nose cone 110 and one or more diverting rings. In the present embodiment, the flow distributor 100 has a first diverting ring 120 and a second diverting ring 130. As will be evident with the benefit of the present disclosure, however, only one diverting ring or a plurality of diverting rings may be used on the flow distributor 100 depending on the particular implementation. The nose cone 110 directs flow of the process gas away from the central axis C of the inlet section 22 and the tube sheet 36 in a manner that provides substantially equal flow symmetrically around the inlet section 22. The diverting rings 120, 130 direct the gas flow both inwardly and outwardly of the ring. In the present embodiment, the first diverting ring 120 is shown angled and sized to direct at least a portion of the diverted gas flow from the nose cone 110 back to the wake or low pressure area of the nose cone 110 along the central axis C of the inlet section 22. The second diverting ring 130 is shown angled and sized to direct the gas flow both inwardly and outwardly of the second ring 130. The number of diverter rings and the orientation and size of the various components are selected for a particular implementation, according to teachings of the present disclosure. Then, the flow distributor 100 can substantially evenly distribute gas across the face F of the tube sheet 36. As depicted by the streamlines G, the flow distributor 100 can thereby reduce or eliminate the recirculation zones in the inlet section 22 described above.

Figures 4A, 4B:
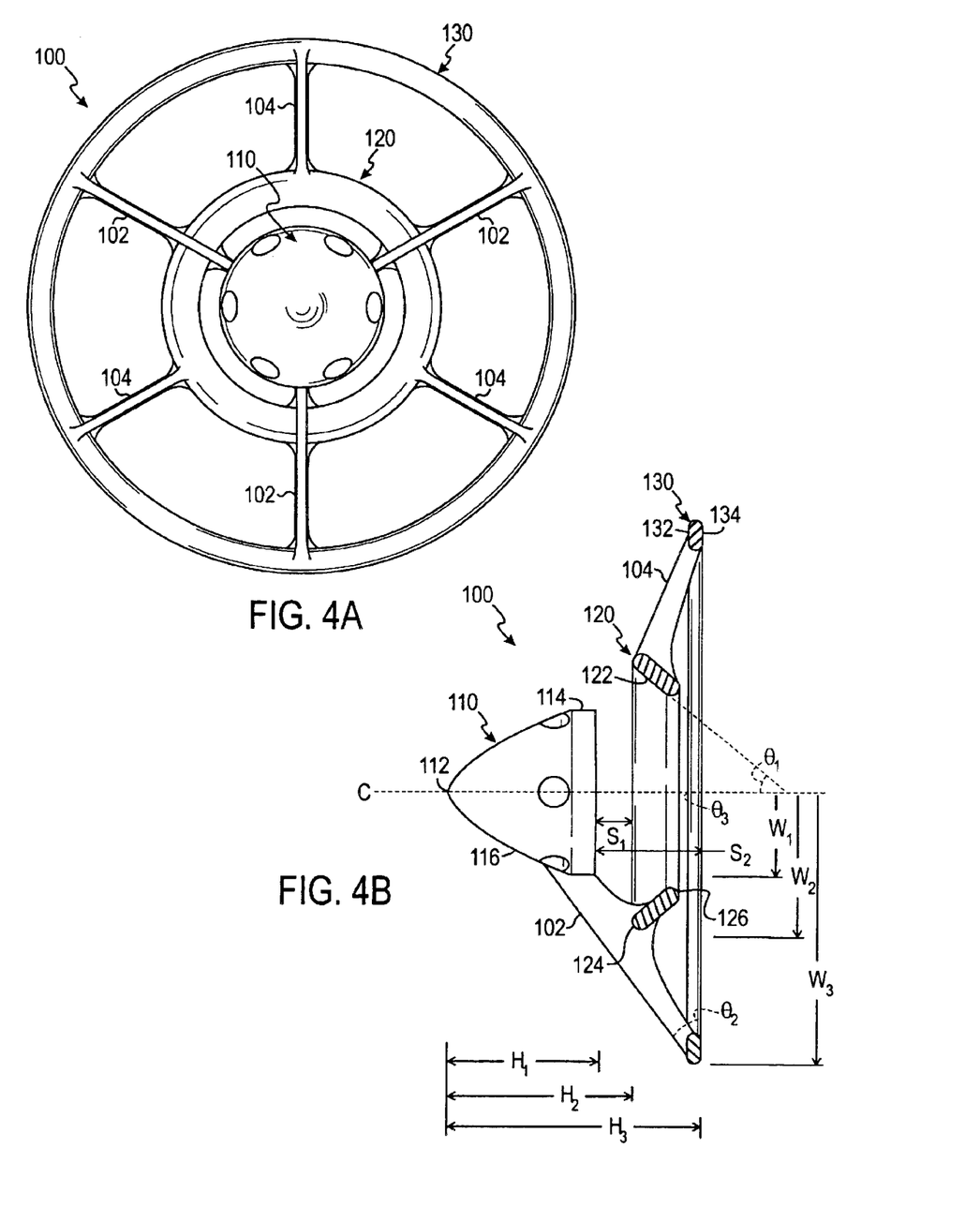
FIGS. 4A–B illustrate side and front views of an embodiment of a flow distributor according to certain teachings of the present disclosure.

Referring now to FIGS. 4A–B, a detailed embodiment of a flow distributor 100 is illustrated in a front and a side view. As best shown in the front view of FIG. 4A, the flow distributor 100 includes a first diverting ring 120 spaced outwardly from a nose cone 110 and includes a second diverting ring 130 spaced outwardly from the first diverting ring 120, although more or less diverting rings may be used for a given implementation. A plurality of struts 102 and 104 connect the first and second diverting rings 120, 130 to the nose cone 110. Preferably, primary struts 102 connect both the first and second diverting rings 120, 130 to the nose cone 110. The secondary struts 104, preferably offset from the primary struts 102, connect the second diverting rings 130 to the first diverting ring 120. The struts 102 and 104 are preferably about 0.438 inches thick. Although the use of these primary and secondary struts 120 and 130 is preferred, a person skilled in the art will appreciate that other arrangements can be used to connect the rings 120 and 130 to the nose cone 110.

The flow distributor 100 is preferably symmetrical about its own central axis C, which is intended to substantially align with the central axis C of the inlet section and tube sheet in which the flow distributor 100 is installed as described herein. Thus, the nose cone 110 and rings 120, 130 are preferably symmetrical about the center axis of the flow distributor 100, the rings 120 and 130 are preferably continuous around the nose cone 110, and the struts 102 and 104 are preferably symmetrically arranged on the flow distributor 100. In the present embodiment of the disclosed flow distributor 100, the first ring 120 is connected to the nose cone 110 by three primary struts 102 arranged about every 120-degrees. The second ring 130 is connected to the first ring 120 and the nose cone 110 by three primary struts 102 arranged about every 120-degrees and by three secondary struts 104 arranged about every 120-degrees.

As best shown in the side view of FIG. 4B, the nose cone 110 has a leading portion 112 and a trailing portion 114 and is aerodynamically shaped to divert impingent gas flow around the nose cone 110. In general, the nose cone 110 is "conical" or is shaped as a "bullet," having curvature to its outer surface. Further teachings for optimizing the shape and size of the nose cone 110 for a given implementation are provided below.

The first diverting ring 120 is spaced outwardly from the nose cone 110. The first diverting ring 120 has a substantially flat surface 122, a leading edge 124, and a trailing edge 126. In the present embodiment, the substantially flat surface 122 is angled at a first angle $\theta_1$ relative to the central axis C to redirect at least a portion of the gas flow diverted by the nose cone 110 into the wake or low pressure area created behind the nose cone 110. Further teachings for optimizing the shape and size of the first diverting ring 120 for a given implementation are provided below.

The second diverting ring 130 is spaced outwardly from the first diverting ring 120. The second diverting ring 130 has a substantially flat surface 132 where flow of the process gas impinges. In the present embodiment, the substantially flat surface 132 is angled at a third angle. $\theta_3$ relative to the central axis C to direct gas flow both inwardly and outwardly of the second ring 130. Further teachings for optimizing the shape and size of the second diverting ring 130 for a given implementation are provided below.

Figure 5:
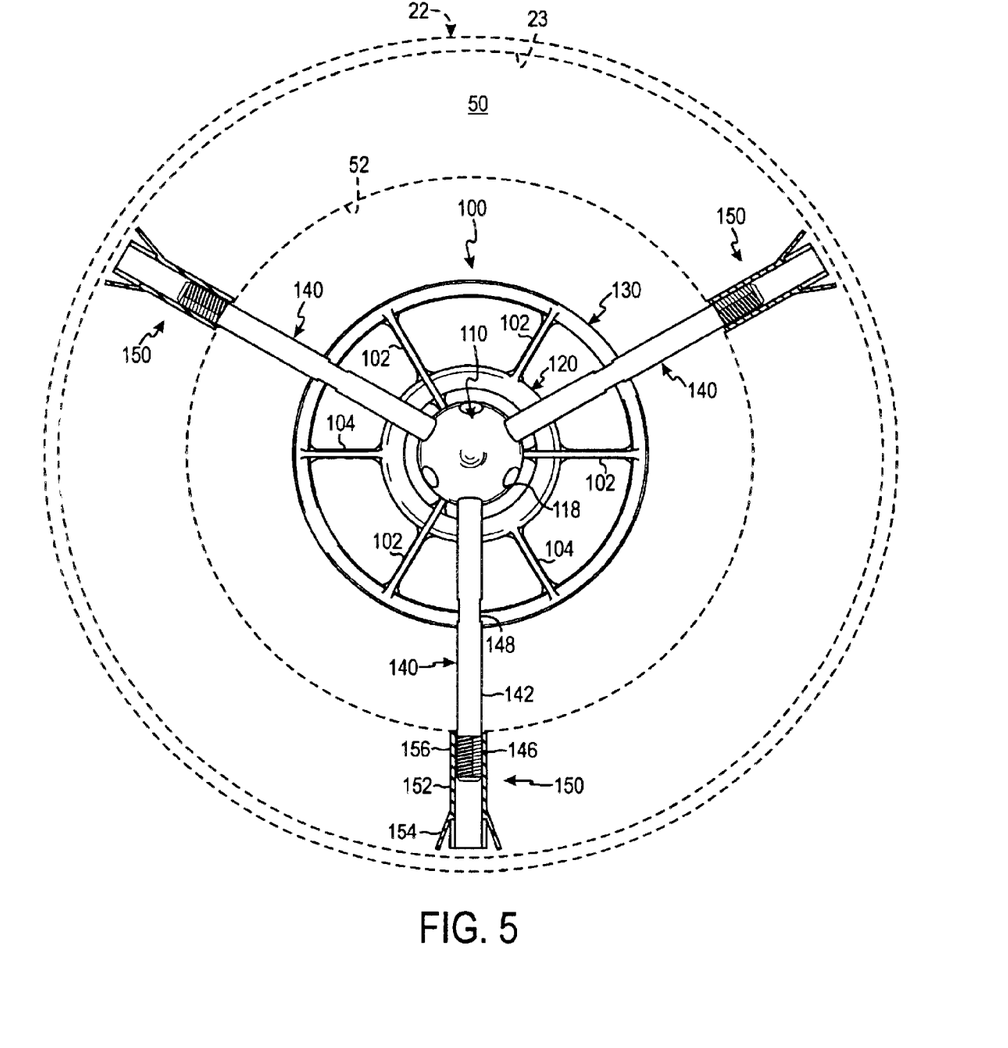
FIG. 5 illustrates a front view of the flow distributor of FIGS. 4A–B mounted in refractory.
Figure 6A:
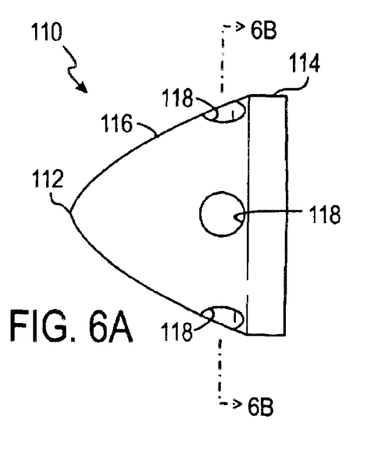
FIGS. 6A–B illustrate side and cross-sectional views of a nose cone of the flow distributor of FIG. 5.
Figure 6B:
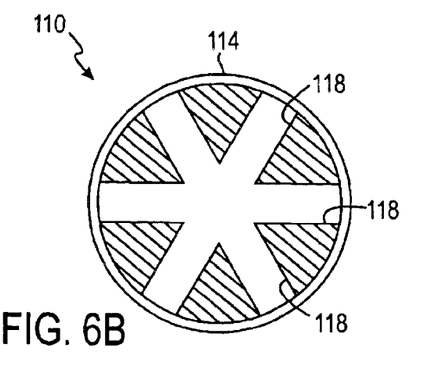
Figure 7:
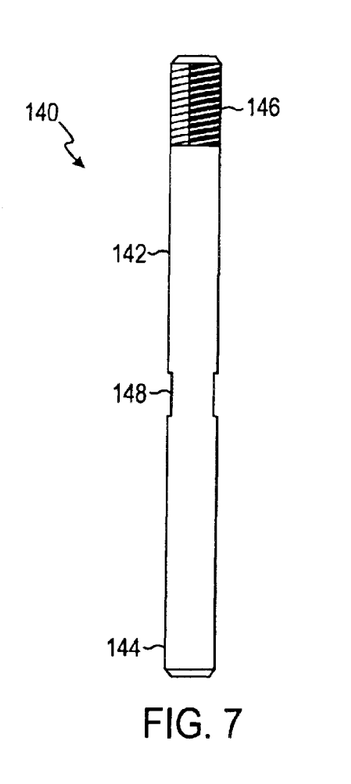
FIG. 7 illustrates an isolated view of a mounting rod of FIG. 5.

Referring to FIGS. 5 through 8, components for mounting the flow distributor 100 in an inlet section 22 of a heat exchanger are discussed. In FIG. 5, the flow distributor 100 is shown mounted in the inlet section 22 by a plurality of mounting rods 140 and anchors 150. A rod 140 is shown in isolated detail in FIG. 7, and an anchor 150 is shown in isolated detail in FIG. 8. The rods 140 are substantially cylindrical and have a smooth end 144 for connecting to the nose cone 110, a threaded end 146 for connecting to an anchor 150, and an intermediate recess 144 for turning the rod 140 with a tool. In one exemplary embodiment, the rods 140 have a diameter of approximately 1.1-inches and have a length of about 15-inches. As shown in FIG. 5, the smooth ends 144 of the rods 140 each position in a hole 118 transversely defined in the nose cone 110. Preferably, the smooth ends 144 and holes 118 have an amount of play accounting for thermal effects and adjustment of tolerances. The holes 118 in the nose cone 110, which are best shown in isolated detail in FIGS. 6A–B, have a diameter of about 1.1-inches and are positioned about 1.5-inches from the trailing end 114 of the nose cone 110.

Figure 8:
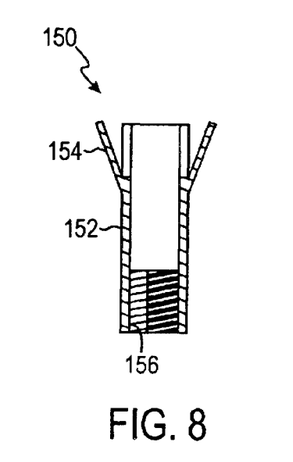
FIG. 8 illustrates a cross-sectional view of an anchor of FIG. 5.

It is preferred that the mounting rods 140 do not connect directly with the wall 23 of the inlet section 22 because the rods 140 may conduct heat from within the inlet section 22 to the wall 23. As best shown in FIG. 5, the threaded ends 146 of the rods 140 each connect to an anchor 150, which are cast in the refractory 50 lining the inlet section 22. The anchors 150 each include a tubular body 152 having flared tabs 154 and a threaded opening 156. The flared tabs 154 bent away from the body 152 of the anchor 150 are embedded in the material of the refractory 50 to help hold the anchor 150 in place. The threaded opening 156 is exposed on the surface 52 of the refractory 150 for threading with the rods 140. When mounting the flow distributor 100 in the inlet section 22, the threaded ends 146 of the rods 140 thread into the threaded openings 156 of the anchors 150 exposed in the refractory 50. The intermediate recess 148 of the rod 140 preferably receives a wrench or the like for rotating the rod 140 when threading the end 146 into the anchor opening 156. As best shown in FIG. 8, the anchor 150 is about 5 inches in length and has a diameter of about 1.5-inches. The flared tabs 154 are about 1.9-inches long and are angled about 20-degrees from the body 152 of the anchor 150.

As shown in FIG. 5, it is preferred that three rods 140 and anchors 150 are preferably used to mount the distributor 100 in the inlet section 22. In addition, it is preferred that the rods 140 and anchors 150 are symmetrically arranged about the central axis of the distributor 100 (e.g., arranged at about every 120-degrees in the present embodiment). Moreover, it is preferred that the three rods 140 and anchors 150 are offset by about 30-degrees from the struts 102 or 104 that interconnect the nose cone 110 and diverter rings 120 and 130. Thus, it is preferred that the holes 118 in the nose cone 110 are also offset by about 30-degrees from the struts 102 or 104. The rods 140 are also preferably mounted forward (i.e., closer to the impingent process gas from the pipe) with respect to a center of gravity of the flow distributor 100 to create a caster effect on the distributor 100 and rods 140 in the flow of the process gas. When the flow distributor 100 is mounted with the rods 140 in the inlet section 22, the flow of the process gas can sufficiently force the distributor 100 such that the holes 118 of the nose cone 110 are forced against the smooth ends 144 of the rods 140 to produce a substantially rigid coupling.

Now that structural details of the disclosed flow distributor 100 have been discussed above, details and methods for improving the distribution of gas flow in a given implementation of an existing process heat exchanger system using the disclosed flow distributor 100 will be discussed.

First, the gas flow characteristics of an existing process heat exchanger system are modeled using techniques of computational fluid dynamics known in the art. For example, the existing process heat exchanger system having an inlet section 22 and tube sheet 36 as shown FIG. 1 may have a number of problems associated with fouling, film boiling, and erosion discussed in the background section of the present disclosure. For a given implementation, a number of variables and parameters of the system may be known or measured. For example, the dimensions and materials of the inlet section 22, the number of transfer tubes 34 in the tube sheet 36, the composition of the process gas, and the flow characteristics of the process gas may be known or measured. A computer model of the existing system is then created with a software system capable of performing computational fluid dynamics (CFD) analysis. Suitable CFD software systems include FIDAP by Fluent Inc. and CFX by ANSYS, Inc. As is known in the art, CFD analysis is used to develop a 2-D, axisymmetric computational fluid dynamic model of the inlet section 22, such as schematically shown in FIGS. 1 and 2. The model is used to estimate the velocity profile at the face F of the tube sheet 36 under current operating conditions in the existing process system, such as shown in FIG. 1.

In building the computer model using CFD analysis, the known or measured variables and parameters of the existing process system are used in combination with a number of assumptions. Firstly, uniform flow of the process gas into the inlet section 22 is assumed. If non-uniform flow exists, the actual velocity at the inlet face F of the tube sheet 36 may be higher than calculated. Secondly, the CFD model is often based on an isothermal assumption. This is acceptable because the desired analysis is on the inlet side of the tube sheet 36 and heat loss is negligible. The tube sheet 36 having the numerous tubes 34 is simulated in the CFD model as a porous element. The porous element properties are set so that the same pressure drop occurs as specified for the process gas on the tube side of the tube sheet 36.

The behavior of the process gas in the inlet section 22 at the tube sheet 36 is a complex phenomenon in which temperature, gas properties, construction material, and a number of other parameters play a role. Using such parameters, a kinetic model can be produced that describes or simulates the behavior. For example, properties of the process gas used in the kinetic model may include the density, viscosity, and average velocity of the gas. The geometry used in the kinetic model may include tube sheet pressure drop, permeability of the tube sheet governed by the number of tubes in the sheet, area of the tube sheet, and other dimensions of the components. One or more of these properties and dimensions may be transformed to dimensionless parameters for use in the CFD models.

CFD analysis is then performed on the existing inlet section 22. As noted above in FIG. 1, the geometry of the inlet section 22 along with flow rate of the process gas can cause recirculation zones at the periphery of the tube sheet 36, thereby increasing the peak velocity at the tube sheet 36 and providing ideal conditions for fouling and plugging of groups of tubes 34. The existence and extent of recirculation zones in the inlet section 22 of the tube sheet 36 is of particular interest in modeling the gas flow characteristics of the existing system. Design of the geometric shape of refractory takes into consideration specific gas flow characteristics, utilizing the gas properties as well as process conditions. CFD and other analysis methods are used to determine the appropriate geometries, pressures, and flow rates that will reduce the recirculation zones within the inlet section 22. Then, changes in the geometry of the refractory and the flow distributor 100 can then be made to optimize the reduction of recirculation zones in the inlet section 20 and to better distribute the process gas.

Based on the modeled gas flow characteristics, an optimal shape for forming the refractory 50, such as shown in FIG. 2, on the inner wall 23 of the inlet section 22 is modeled to reduce the existence or extent of recirculation. For example, the refractory 50 can be given a trumpet or bell shaped design to eliminate recirculation zones. The refractory 50 can be formed with a first tapered section that extends from the inlet of the inlet cone 22, past the distributor anchors (not shown), and to a point of about 75–80% of the axial expanse $D_1$ of the inlet cone 22. Then, the refractory 50 can be formed with a second tapered section to form a bell shape near the tube sheet 36. The geometric shape of the refractory 50 on the inner wall 23 of the inlet section 22 can reduce the average velocity in the inlet cone 22. If the average velocity of an inlet section without the shaped refractory 50 is about 1881 in/sec., for example, then the shaped refractory 50 may reduce the average velocity to about 1590 in/sec. In addition, the geometric shape of the refractory 50 can allow the process gas to be better distributed across the tube sheet 36.

Once a suitable geometry for the refractory 50 is estimated, the CFD model is then used to assess the inlet cone 22 having the modified refractory 50 and a modeled flow distributor 100 according to teachings of the present disclosure and as schematically shown in FIG. 2. Initial results of axisymmetric CFD analysis are obtained with the modeled flow distributor 100 and the modified refractory 50. Then, the modeled flow distributor 100 and refractory 50 are co-developed in an iterative process, which may require numerous iterations, to distribute the process gas and to allow more uniform flow distribution, velocity, and temperature gradient on the face F of the tube sheet 36.

Exemplary details of the flow distributor 100 are discussed with reference to FIGS. 3 and 4A–B. The nose cone 110 is sized and shaped to distribute any centrally located jet of gas in the section 22 and to disperse the flow coming into the center axis C of the inlet section 22 at an angle that is most conducive to redirection by the one or more rings 120, 130 of the flow distributor 100. Thus, the nose cone 110 is substantially positioned at the central axis C of the inlet section 22 and is preferably symmetric about the central axis C. A person skilled in the art will appreciate that the shape and size of the nose cone 110 can vary from one implementation to another. In general, however, the basic geometry of the nose cone 110 may not change from one implementation to another, but its overall size or diameter may change given the size of the inlet section 22, tube sheet 36, or refractory 50, for example. When performing the CFD analysis, the size of the nose cone 110 may be initially selected to be about 30–40% of the inlet cone diameter before the transition to the trumpet section of the modeled refractory 50. As best shown in FIG. 4B, the nose cone 110 can generally have an axial expanse $H_1$ of about 2 to 20-inches and a radial expanse $W_1$ of about 2 to 200-inches. The nose cone 110 preferably has a tip on the leading portion 112 that is defined by a small radius of curvature. In addition, the nose cone 110 preferably has an outer surface 116 following the tip on the leading portion 112 that is defined by a lager radius of curvature. The trailing portion 114 is preferably defined by a substantially cylindrical surface.

In one exemplary implementation of FIG. 3, the piping 20 may have a radial dimension $R_1$ of about 11.625-inch, and the inlet section 22 to the transfer line heat exchanger may have an axial expanse $D_1$ of about 32-inches from the furnace piping 20 to the inlet tube sheet 36. The inlet cone 22 may define an inside diameter at the tube sheet 36 of about 23-inches. The pressure drop across the tube sheet 36 may be about 1.5 $lb_f/in^2$. The inlet flow may initially be 766,000 $in^3$/sec, and the average inlet velocity may initially be about 1804 in/sec. The process gas may have a density of about $1.8 \times 10$-5 $lb_m/in^3$ and a viscosity of about $3.9 \times 10$-9 $lb_f/in^2$. Once formed, the refractory 50 may have a radial dimension $R_2$ about 21-inches in such an exemplary implementation adjacent the tube sheet 36. Using details of the exemplary implementation discussed above, the axial expanse $H_1$ of the nose cone 110 in FIG. 4B can be about 5.3-inches, and the radial expanse $W_1$ can be about 3-inches, for example. In addition, the nose cone 110 for such an exemplary implementation can have a leading portion 112 defined by a radius of about 0.4-inch and can have an outer surface 116 defined by another radius of about 9.1-inches.

The size and orientation of the one or more diverter rings 120, 130 is selected within the inlet section 22 to divert the process gas outside the nose cone 110. Selection of the number of rings is governed by the size of the inlet section 22, tube sheet 36, and refractory 50 and is governed by the velocity and density of the process gas. In general, more than one ring may be used for lager implementations and/or for faster and denser process gasses. In addition, a person skilled in the art will appreciate that the size of the first diverting ring 120 can vary from one implementation to another. For example, the diameter of the first ring 120 depends in part on the diameter of the nose cone 110. In general, the substantially flat surface 122 of the first ring 120 can be arranged at a first angle $\theta_1$ of about 0 to 180-degrees relative to the central axis C to substantially redirect at least a portion of the gas flow distributed by the nose cone 110 in to the wake or low pressure area created by the nose cone 110. The primary struts 102 connecting the first ring $\theta_1$ to the nose cone 110 can be arranged at a second angle $\theta_2$ of about 37-degrees. The first diverting ring 120 can generally be positioned at an axial expanse $H_2$ of about 3 to 300-inches so that the leading edge 124 of the first diverting ring 120 can be spaced an axial separation S1 of about 5 to 15-inches behind the trailing portion 114 of the nose cone 110. The first diverting ring 120 can have a radial expanse $W_2$ of about 5 to 200. The width of the first diverting ring 120 can be about 0.25 to 10-inches, and the thickness can be about 0.15 to 2.5-inches. Preferably, the edges of the first diverting ring 120 are rounded, as are the edges of other portions of the distributor 100.

Using the details of the exemplary implementation discussed above, the substantially flat surface 122 of the distributor 100 can be arranged at a first angle $\theta_1$ of about 42-degrees relative to the central axis C to redirect at least a portion of the gas flow distributed by the nose cone 110 into the wake or low pressure area of the nose cone 110. The first diverting ring 120 can be positioned at an axial expanse $H_2$ of about 6.8-inches so that the leading edge 124 of the first diverting ring 120 can be spaced an axial separation S1 of about 1.5-inches behind the trailing portion 114 of the nose cone 110. The first diverting ring 120 can have a radial expanse $W_2$ of about 5.15-inches. The width of the first diverting ring 120 can be about 2.0-inches, and the thickness can be about 0.438-inches.

As noted above, an additional or second diverter ring 130 may be used for a given implementation. The size and orientation of the additional, second diverter ring 130 can be selected within the inlet section 22 to divert impingent gas flow. In general, the diameter of any additional second ring 130 depends in part on the diameter of the first ring 120 and the overall size and shape of the inlet section 22 and refractory 50. To divert impingent gas flow, the substantially flat surface 132, as shown in FIG. 4B, can define an angle $\theta_3$ of about 45 to 135-degrees relative to the central axis C.

The second diverting ring 130 can be positioned at an axial expanse $H_3$ of about 2 to 100-inches and can have a radial expanse $W_3$ of about 5 to 500-inches. In addition, the second ring 130 can be spaced an axial separation $S_2$ of about 2 to 200-inches from the end of the nose cone 110. The width of the second diverting ring 120 can be about 0.25 to 25-inches, and the thickness can be about 0.1 to 3-inches. A person skilled in the art will appreciate that the size and orientation of the second diverting ring 130, however, can vary from one implementation to another.

Using the details of the exemplary implementation discussed above, the substantially flat surface 132 can define an angle $\theta_3$ of about 90-degrees relative to the central axis. The second diverting ring 130 can be positioned at an axial expanse $H_3$ of about 9.0-inches and can have a radial expanse $W_3$ of about 10-inches. In addition, the trailing surface 134 of the second ring 130 can be spaced an axial separation $S_2$ of about 4-inches from the end of the nose cone 110. The width of the second diverting ring 120 can be about 0.9-inches, and the thickness can be about 0.438-inches. Therefore, as best shown in FIG. 3, the flow distributor 100 can have an expanse $D_2$ of about 9-inches and may be distanced an axial expanse $D_3$ from the tube sheet 36 by about 4-inches for such an exemplary implementation. In addition, the flow distributor 100 may have an overall radial dimension $R_3$ of about 10-inches.

A person skilled in the art of computational fluid dynamics will appreciate that optimizing the sizes and orientations of these modeled components 110, 120, and 130 of the flow distributor 100 to achieve a substantially even distribution of process gas flow on the tube sheet 36 involves an iterative process using techniques of computational fluid dynamics known in the art. It is understood that variables for a particular implementation can vary widely from those of another implementation. Guidance as to the assumptions when setting up the CFD model to develop the optimal geometry of the flow distributor 100 and to approximate ranges of the positions, sizes, widths, diameters, separations, and angular orientations among the various modeled components 110, 120, and 130, and so on, of the distributor 100 has been provided herein. During the iterative CFD analysis, it may be necessary to first model an initial orientation and size of the refractory, nose cone, and one or more rings. After initial iterations, it may then be necessary for one to alter the shape, size, or taper of the refractory to improve the distribution of gas. As a consequence, the orientation and size of the nose cone and one or more rings may then need to be altered for further improvement of the results. During the iterative CFD analysis, a number of attributes of the nose cone and one or more rings y need to be adjusted or varied. For example, a position along a central axis of the input section, a diameter, an axial expanse, or a surface curvature of the nose cone may need to be adjusted or varied, or the radius, width, relative separation from the nose cone, or angular orientation of one or more diverter ring may need to be adjusted or varied. Furthermore, further refinements of the refractory may be required.

Once a preferred geometry of the components 110, 120, and 130 of the flow distributor 100 has been modeled, the inlet section 22 of the existing process heat exchanger system is lined with the preferred geometry of refractory 50 having embedded anchors 150, as shown in FIG. 5. Then, a flow distributor 100 having the preferred modeled geometry obtained through CFD analysis is fabricated and installed in the lined inlet section 22 at the preferred position using the mounting rods 140. When so built, the disclosed flow distributor 100 redistributes the flow in the inlet section 22 so that the disclosed flow distributor 100 has a low-pressure drop and the flow is substantially equally distributed across the face F of the tube sheet 36.

Use of the disclosed flow distributor 100 according to the teachings of the present disclosure in the inlet of a transfer line heat exchanger can reduce maintenance requirements of the heat exchanger and can increase the overall heat exchange rate by about 5 to 10 percent. For example, the flow distributor 100 can reduce the occurrence of fouling on the tube sheet 36 and reduces damaging heat flux conditions caused by high flow velocities. The flow distributor 100 can improve distribution, temperature gradient, and velocity of the process gas across the tube sheet 36. The disclosed flow distributor 100 and geometry of the refractory 50 can prevent recirculation in the inlet section 22, which reduces the potential for fouling of the tube sheet 36.

In testing, it has been shown that a flow distributor 100 according to the teachings of the present disclosure used with preferred refractory can reduce the peak velocity at the face F of the tube sheet 36 by as much as 50%. The reduction in the velocity of the process gas at the face F of the tube sheet 36 helps to lower the heat transfer film coefficients on the process gas side compared to that presently experienced in the transfer line heat exchanger and helps to lower the associated temperatures. In addition, the flow distributor 100 diverts particles, if present, in the process gas from directly impacting the center of the tube sheet 36 and reduces the speed of any particle.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the invention include all modifications and alterations to the full extent that they come within the scope of the following claims or the equivalents thereof.

What is claimed is:

1. In a heat exchanger system having an inlet conveying gas to a heat exchanger, a device mounted in the inlet for more evenly distributing the gas into the heat exchanger, comprising:

a cone positioned in the inlet and diverting impingent gas around the cone such that an area of low pressure is formed behind the cone; and a ring positioned outwardly from the cone and redirecting at least a portion of the gas diverted by the nose cone into the area of low pressure behind the cone.

2. The device of claim 1, wherein the cone comprises an outer surface defined by a radius of curvature.

3. The device of claim 1, wherein the ring comprises a substantially flat surface having gas flow impinge thereon and being oriented at an angle relative to an axial centerline of the cone that is between approximately 0 to 180-degrees.

4. The device of claim 1, further comprising a plurality of struts connecting the ring to the cone.

5. The device of claim 1, further comprising one or more additional rings positioned outwardly from the ring and from each other and diverting gas flow impingent thereon.

6. The device of claim 5, wherein the one or more additional rings each comprise a substantially flat surface having gas flow impinge thereon and being oriented at an angle relative to an axial centerline of the cone that is between approximately 45 to 135-degrees.

7. The device of claim 1, further comprising means for mounting the device within the inlet.

8. A device mounting in an inlet into a heat exchanger for distributing gas, comprising:
   a nose cone positioned substantially on a central axis of the inlet and aerodynamically shaped to divert impingent gas around the nose cone; and
   a first diverting ring spaced outwardly from the nose cone and oriented such that at least a portion of the gas diverted by the nose cone is redirected into the wake of the nose cone.

9. The device of claim 8, wherein the nose cone comprises an outer surface defined by a radius of curvature and having a leading portion with a smaller diameter than a trailing portion.

10. The device of claim 8, wherein the first diverting ring comprises a substantially flat surface having gas flow impinge thereon and being oriented at an angle relative to an axial centerline of the nose cone.

11. The device of claim 10, wherein the angle is between approximately 0 to 180-degrees.

12. The device of claim 8, further comprising a plurality of struts connecting the first diverting ring to the nose cone.

13. The device of claim 8, further comprising a second diverting ring spaced outwardly from the first diverting ring and oriented to divert gas flow impingent thereon.

14. The device of claim 13, further comprising a plurality of struts connecting the second diverting ring to the first diverting ring.

15. The device of claim 13, wherein the second diverting ring comprises a substantially flat surface having gas flow impinge thereon and being oriented at an angle relative to an axial centerline of the cone.

16. The device of claim 15, wherein the angle is between approximately 45 to 135-degrees.

17. The device of claim 13, wherein the first diverting ring is spaced a first axial distance from a trailing end of the nose cone, and wherein the second diverting ring is spaced a second axial distance from the trailing end that is greater than the first axial distance.

18. The device of claim 8, further comprising a plurality of rods for mounting the device within the inlet, each rod having a first end connecting to the nose cone and having a second end connecting to the inlet.

19. The device of claim 18, wherein the nose cone defines holes receiving the first ends of the rods.

20. The device of claim 18, further comprising a plurality of anchors mounted in refractory material lining the inlet and having the second ends of the rods threaded therein.

21. A heat exchanger for gas having a tube sheet, comprising:
   an inlet having an inner wall and a central axis, the inlet attaching to the heat exchanger adjacent the tube sheet;
   a refractory lining the inner wall of the inlet; and
   a device mounting in the inlet for substantially evenly distributing impingent gas on the tube sheet, including:
      a cone positioned substantially on the central axis of the inlet and diverting impingent gas around the cone; and
      at least one ring spaced outwardly from the cone and diverting at least a portion of the gas diverted by the cone.

22. The device of claim 21, wherein the at least one ring comprises a substantially flat surface having gas flow impinge thereon and being oriented at an angle relative to an axial centerline of the cone that is between approximately 0 to 180-degrees.

23. The device of claim 21, further comprising a plurality of struts connecting the at least one ring to the cone.

24. The device of claim 21, further comprising a plurality of rods for mounting the device within the inlet, each rod having a first end connecting to the cone and having a second end connecting to the inlet.

25. The device of claim 24, further comprising a plurality of anchors fixedly mounted in the refractory and having the second ends of the rods threaded therein.

26. A method for improving an existing heat exchanger system, which includes gas conveyed to a heat exchanger through an input section, comprising the steps of:
   a) modeling the gas characteristics of the existing heat exchanger system;
   b) optimizing the shape of refractory in the input section based on the gas characteristics;
   c) optimizing the size and orientation of a nose cone within the input section to distribute any centrally located jet of gas;
   d) optimizing the size and orientation of one or more diverter rings within the input section to divert impingent gas within the input section;
   e) fabricating an assembly comprising the nose cone and the one or more diverter rings; and
   f) installing the assembly in the input section having the shaped refractory.

27. The method of claim 26, wherein step (c) comprises the step of iteratively determining a position of the nose cone along a central axis of the input section, a diameter of the nose cone, an axial expanse of the nose cone, or a surface curvature of the nose cone.

28. The method of claim 26, wherein step (d) comprises the step of iteratively determining a radius of a first diverter ring, a width of the first diverter ring, a relative separation of the first diverter ring from the nose cone, or an angular orientation of the first diverter ring to divert at least a portion of gas distributed by the nose cone into the wake of the nose cone.

29. The method of claim 26, wherein step (d) comprises the step of iteratively determining a radius of one or more second diverter rings, a width of one or more second diverter rings, a relative separation of one or more second diverter rings from the nose cone, or an angular orientation of one or more second diverter rings within the input section to divert gas impingent thereon.

30. The method of claim 26, wherein step (d) comprises the step of using more than one diverter ring within the input section based on a size of the input section or based on characteristics of the gas flow.

31. The method of claim 26, wherein step (f) comprises the step of mounting the assembly in the inlet section with a plurality of rods and anchors.

* * * * *